US012106072B2

(12) United States Patent
Xing et al.

(10) Patent No.: US 12,106,072 B2
(45) Date of Patent: Oct. 1, 2024

(54) INTEGRATION FLOW WORKLOAD DISTRIBUTION

(71) Applicant: INTERNATIONAL BUSINESS MACHINES CORPORATION, Armonk, NY (US)

(72) Inventors: Chengxuan Xing, Winchester (GB); John Anthony Reeve, Winchester (GB); John Hosie, Eastleigh (GB); Benjamin Graham Thompson, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/706,736

(22) Filed: Mar. 29, 2022

(65) Prior Publication Data

US 2023/0315396 A1    Oct. 5, 2023

(51) Int. Cl.
*G06F 8/10*    (2018.01)
*G06F 8/41*    (2018.01)
*G06F 8/70*    (2018.01)

(52) U.S. Cl.
CPC ............ *G06F 8/10* (2013.01); *G06F 8/433* (2013.01); *G06F 8/70* (2013.01)

(58) Field of Classification Search
CPC ............ G06F 8/10; G06F 8/71; G06F 8/433
See application file for complete search history.

(56) References Cited

U.S. PATENT DOCUMENTS

| 10,419,524 | B2  | 9/2019  | Schincariol et al. |
| 10,635,669 | B1  | 4/2020  | Cappiello |
| 2008/0244507 | A1 | 10/2008 | Hodson et al. |
| 2017/0149641 | A1* | 5/2017 | Hosie ................. G06F 9/5033 |
| 2017/0286162 | A1 | 10/2017 | Corley et al. |
| 2019/0087075 | A1* | 3/2019 | Dhayanithi ......... G06F 3/04842 |
| 2019/0188006 | A1* | 6/2019 | Ritter ..................... G06F 8/433 |
| 2020/0069877 | A1 | 3/2020 | Handler |
| 2020/0183947 | A1* | 6/2020 | Reeve ................. G06F 16/254 |
| 2020/0228403 | A1* | 7/2020 | Klinger ............... G06F 9/45558 |
| 2021/0124576 | A1* | 4/2021 | Gungabeesoon ......... G06F 8/38 |

* cited by examiner

*Primary Examiner* — Ziaul A Chowdhury
(74) *Attorney, Agent, or Firm* — Scott S. Dobson

(57) ABSTRACT

An integration flow can be improved with the use of a pattern identified from a pattern library. The identified pattern can include a snippet of nodes which are functionally equivalent to a subset of nodes in the integration flow. The pattern also lists an endpoint capable of performing the snippet of nodes. The integration flow can therefore be updated to cause the endpoint to perform the snippet of nodes.

20 Claims, 6 Drawing Sheets

INTEGRATION FLOW WORKLOAD DISTRIBUTION

BACKGROUND

The systems and methods of the present disclosure relate to integration flows.

As computing systems become more interconnected, various applications are expected to collaborate with one another. Integration flows are tools designed to aid in development of applications that require interaction with other, often third-party applications. For example, a hospital management system may need to interact with multiple external computer systems, such as weather trackers, electrical grid monitors, etc. A developer creating such a system may create an integration flow to organize these connections. For example, the integration flow may depict which subsystems of the hospital system are responsible for communicating with weather systems, which are designed to monitor intake trends, etc. Integration flows are useful to enable complex interactions between multiple different applications, often with relatively little knowledge of how one another functions internally.

Integration flows typically comprise a number of "nodes," representing actions or decisions. These nodes can also include additional information, identifying details such as, for example, which application (or "endpoint") is responsible for performing the actions, what information (if any) is required before the node's actions can be performed, where information is to be sent, etc.

SUMMARY

Some embodiments of the present disclosure can be illustrated as a method. The method includes receiving an integration flow including a subset of nodes. The method also includes identifying a pattern including a snippet of nodes, where the snippet can be performed by an endpoint. The snippet is functionally equivalent to the subset of nodes in the integration flow. The method also includes updating the integration flow to cause the first endpoint to perform the snippet of nodes.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
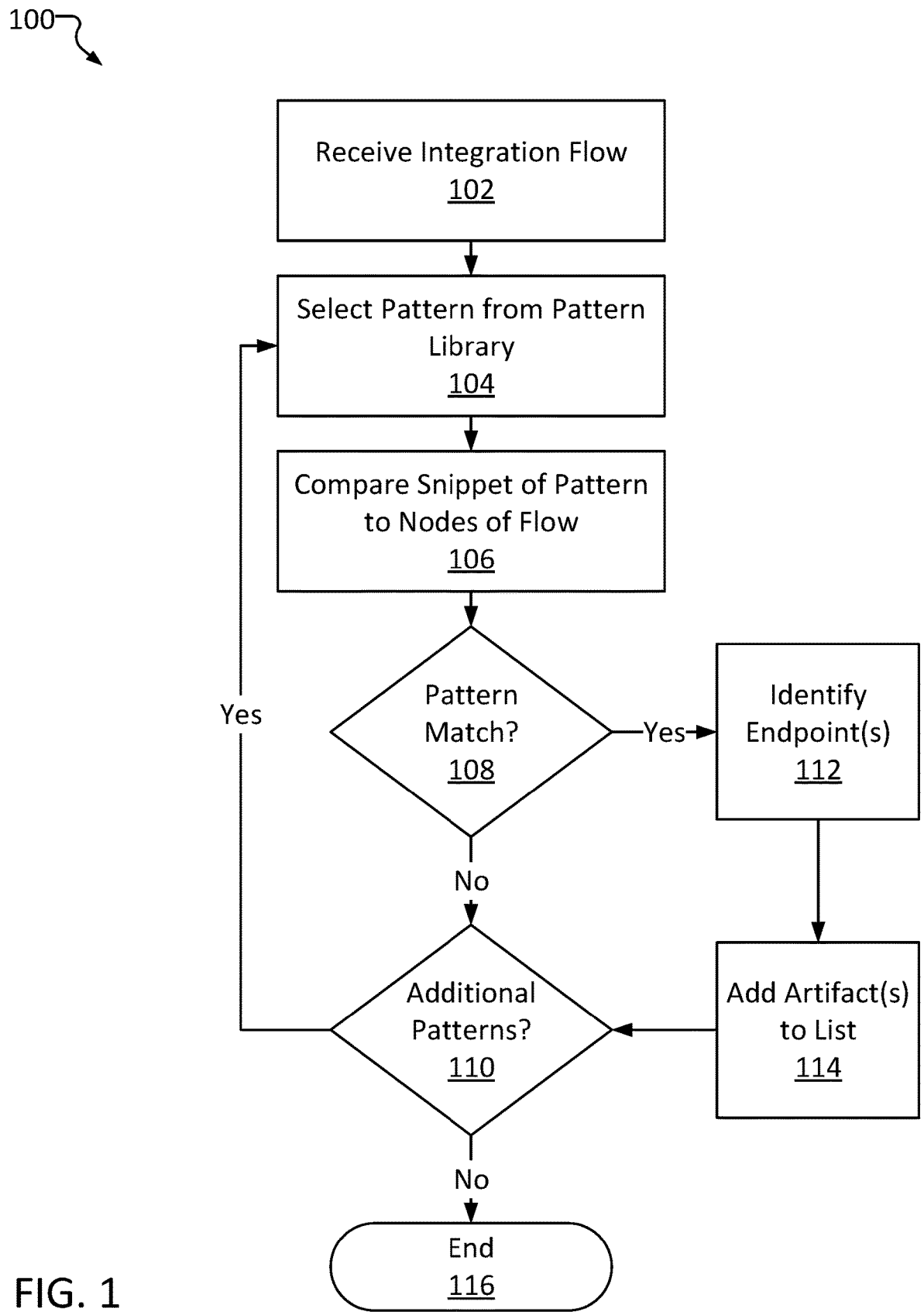
FIG. 1 is a flowchart of a high-level integration flow workload distribution method, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to enhance integration flows. More particular aspects relate to systems and methods to identify a pattern that includes a snippet of nodes matching a subset of nodes in an integration flow, and to update the integration flow to cause an endpoint to perform the snippet of nodes.

Integration flows are useful to enable complex interactions between multiple different applications. In particular, many integration flows can be developed and can function with relatively little knowledge of how various applications included in the integration flow function internally. Integration flows are often created by a developer of a particular system, enabling the system to interact with multiple third party applications (also called third party "endpoints") to perform various functions. The developers of the integration flow are often developers of the system, and as a result, the developers of the integration flow are often primarily familiar with the capabilities of the system itself. Thus, the developers may be relatively unfamiliar with the capabilities of whatever third party applications the system might interact with. Further, it can be difficult to view an "overall" integration logic when functionalities of the integration flow are distributed throughout different third party applications. As a result, integration flows often fail to capitalize on capabilities of those third party applications, which can result in wasted resources.

As an example, a developer of a mobile application for an airline may create an integration flow showing that the airline application should pull data from a first endpoint, send it to a second endpoint for analysis, receive results from the second endpoint, and send the results to a third endpoint. However, the third endpoint may be capable of pulling the data from the first endpoint and analyzing it by itself. This could be substantially faster; rather than communicate directly with three different endpoints, the airline application may only need to communicate directly with one. Further, the second endpoint may not be needed at all. However, the developer of the airline application may not be aware that the third endpoint is capable of doing this.

To address the above issues, systems and methods consistent with the present disclosure enable automatic detection of possible alternative constructions of integration flows. In addition, systems described herein can enable storage of ready-to-use "artifacts" (essentially precompiled code) that can be sent to various endpoints to enable even easier implementation.

As an example, the airline application developer may utilize embodiments of the present disclosure to identify that the third endpoint is capable of, as previously discussed, pulling the data from the first endpoint and analyzing it by itself. The integration engine described herein can also provide the developer with an artifact to be executed by the third endpoint, causing the third endpoint to perform the operations. This way, the developer does not need to become familiar with the inner complexities of the third endpoint in order to implement it into the flow.

An example integration flow can be described as comprised of smaller groups of nodes referred to as "snippets." Integration flows are likely to include multiple snippets, often with each snippet performing a particular function. For example, an integration flow designed to perform some function may include twelve nodes, and three of those nodes may, as a group, perform a "send navigation route" function. As a result, this group of three nodes may be considered a "send navigation route" snippet. A different integration flow designed to perform a different function might contain eighteen nodes, but three of those eighteen nodes may also be configured to form the same "send navigation route" snippet. Thus, in some ways, snippets can be considered "building blocks" of integration flows. However, not every node in an integration flow is necessarily part of a snippet, and some nodes can be parts of multiple snippets. Further, snippets may not necessarily be explicitly designated as such.

Systems and methods consistent with the present disclosure can utilize a library of "patterns" to assist in workload distribution within integration flows. A "pattern," as used herein, may include both a snippet of nodes and a corresponding set of third party artifacts which can be deployed and used to cause endpoints to achieve the same functionality of the snippet. In other words, a pattern describes what an endpoint can do (snippet) and provides the code/compiled executable(s) (the artifact(s)) to cause the endpoint to do it.

The library of patters (or "pattern library") can enable systems and methods consistent with the present disclosure to match stored snippets with subsets of nodes of an integration flow. The term "subset," as used in this disclosure, refers to an arbitrary grouping of nodes in an integration flow. As such, a subset may or may not constitute a snippet. In essence, systems and methods consistent with the present disclosure enable analyzing an integration flow to compare subset of the flow to known snippets. This comparison can enable a developer to identify subsets of the flow that can be replaced by a snippet to yield functionally equivalent results.

As an illustrative example, a subset in an integration flow may include three connected nodes. These nodes may represent a first application being configured to generate a navigation route and send it to a third-party navigation application of a user's mobile device. However, the third-party navigation application may be capable of generating the navigation route by itself, and possibly even more efficiently/effectively than the first application can. This can be recognized via a stored pattern. The stored pattern may include three main components to assist in enabling integration flow workload distribution: A snippet, a list of endpoints capable of performing the snippet, and artifacts to cause the endpoints to do so.

The snippet, as discussed above, may include the three nodes that represent the first application that is being configured to generate and transmit a navigation route. For example, the nodes could be a "receive destination" node, a "generate route" node, and a "send route to device" node. Notably, the nodes of the pattern's snippet may not necessarily be identical to the nodes of the integration flow's subset. However, the snippet may be known to yield results that are functionally equivalent to results of the subset. Put differently, performing the nodes of the subset and performing the nodes of the snippet may achieve the same results.

The list of endpoints enables determining whether any endpoints of the integration flow are capable of performing the snippet. For example, the pattern may indicate that the third-party navigation application can perform the snippet and thus achieve the same results as the subset. For example, regardless of whether the subset is performed as set out in the integration flow or the snippet is performed by the third-party navigation application, the device is provided with the navigation route. The artifacts may enable a developer of the integration flow to cause a chosen endpoint to perform the functionality of the subset, notably without needing to be familiar with the inner workings of the endpoint.

As a result, the example stored pattern can enable a developer to determine that the third party navigation app can also provide the functionality outlined in the subset of nodes, meaning the first application may not need to. Further, by providing the appropriate artifacts, the pattern can enable the developer to easily adjust the integration flow to cause the third party navigation application to perform the steps of the snippet. Further, the pattern can indicate whether any other endpoints in the flow are similarly capable of performing the steps of the snippet.

Multiple patterns can be stored in a "pattern library," allowing a developer of an integration flow to compare the integration flow against the pattern library and find possible ways to distribute the workload. In some instances, the pattern library can be added to over time, such as upon developers consulting with experts on given endpoints. In some instances, the pattern library may be maintained by a third party. In some instances, developers of third-party applications may add patterns to the pattern library.

As an example, a developer of an integration flow may submit the integration flow to an integration flow management application. The integration flow management application may be augmented via systems and methods of the present disclosure. The developer may then utilize the management application to evaluate the integration flow, at which point the methods described below can be utilized to identify potential endpoints that can perform snippets to replace subsets of the flow. Further, the management application can determine or create multiple different iterations of the flow, each iteration utilizing a different set of endpoint-node assignments. For example, a first iteration could require a first endpoint to perform a first node and a second node while a second endpoint performs a third node. However, a second iteration could require the first endpoint to perform the first node while the second endpoint performs the second node and the third node. Further, a third iteration could require a third endpoint to perform all three nodes. These iterations can be presented to the developer, enabling the developer to select a preferred iteration. These iterations can also be referred to as "candidate endpoints." This advantageously improves the design process of integration flows, as the developer need not be intimately aware of the capabilities of each of the various endpoints. In particular, the developer may not even be aware of the existence of the third endpoint (or that it is capable of performing a significant portion of the flow). However, thanks to the improved management application enabled by the present disclosure, the developer may be enabled to identify improvements that the third endpoint might yield and may be able to implement them via included artifacts associated with the endpoint.

In some instances, systems and methods consistent with the present disclosure may be configured to automatically update and/or improve an existing integration flow. For example, in some instances, an existing integration flow can be submitted to the integration flow management application, which may present a developer with an option to "optimize" the flow. In some instances, submission of the flow itself may be considered assent to optimization. To optimize the flow, systems and methods consistent with the present disclosure may determine a number of flow iterations and select a best option based on various criteria. Criteria can include, for example, a number of nodes, a number of endpoints, a number of data transfers between endpoints, a number of "consolidate" nodes (where data from multiple different endpoints is necessary to proceed), and the like. Based on the criteria, the management application may automatically make adjustments to the flow, such as by sending associated artifacts to appropriate endpoints.

FIG. 1 is a flowchart of a high-level integration flow workload distribution method 100, consistent with several embodiments of the present disclosure. Method 100 may be performed by, for example, an integration engine, such as integration engine 400, described below in detail with reference to FIG. 4.

Method 100 comprises receiving an integration flow at operation 102. Operation 102 may include loading a saved integration flow or accessing an already-loaded integration flow. In some instances, the integration flow may be a work-in-progress integration flow, and method 100 may be performed as part of developing the flow. As an example, a user may be developing an integration flow, and opt to perform method 100 to determine whether any of the workload involved in the integration flow may be distributed differently. The integration flow received via operation 102 may include one or more nodes as well as connections between the nodes. Each node may include additional information such as a list of connected nodes, conditions, execution parameters, etc.

Method 100 further comprises selecting a pattern from a pattern library at operation 104. The pattern library may be a proprietary database that includes a collection of snippets that can be performed by various specific endpoints. For example, the pattern library may include a "send navigation route" pattern, which may include a snippet that can be performed by a navigation application. In such an example, the navigation application may be an "endpoint." Operation 104 may include, for example, selecting a pattern from the library at random, iterating through a list of patterns, etc. In some instances, operation 104 may include filtering the pattern library; for example, operation 104 may include filtering the pattern library to only provide patterns that are associated with endpoints in the integration flow.

Method 100 further comprises comparing, at operation 106, a snippet of the pattern to nodes in the received flow. As described above, a "snippet" of a pattern, as used herein, refers to a collection of nodes. Each pattern in the pattern library may include a snippet. For example, a "navigation route" pattern may include a snippet that has nodes such as "acquire destination," "acquire location," and "plot route from location to destination." Operation 106 may include, for example, searching the integration flow received at block 102 for a node included in the snippet of the pattern selected at block 104 and, upon finding a matching node, checking whether the surrounding nodes in the received integration flow also match the snippet. Continuing with the "navigation route" example, operation 106 may include searching the integration flow for an "acquire destination" node. If the integration flow has such a node, operation 106 may further include checking whether the integration flow includes an "acquire location" node connected to the "acquire destination" node, and so on.

As another example, operation 106 may include selecting a subset of nodes in the flow and comparing the subset to the snippet of the pattern. As described above, a "subset" of an integration flow refers to an arbitrary grouping of nodes in the flow. In such an example, the subset may be selected at random, or subsets may be iterated through following a predetermined algorithm, etc.

Method 100 further comprises determining whether a pattern match is found at operation 108. Operation 108 may include, for example, determining whether operation 106 yielded a match between the pattern's snippet and the nodes of the integration flow. Operation 108 may further include determining whether the integration flow includes an endpoint indicated by the pattern as being capable of performing the functionality of the subset.

In some instances, operation 108 may include a threshold comparison to enforce a minimum number of nodes in both the subset and the snippet. As an example, a snippet of four nodes may be compared to an integration flow via operation 106, and the integration flow may be found to include a subset having 3 of the 4 nodes, but performing the same function. As a result, even though the integration flow doesn't include/match the entire snippet on a "node to node" basis, a "match percentage" may be compared to a threshold. For example, operation 108 may have a threshold "match percentage" of 60%, whereas the ¾ nodes may result in a match percentage of 75%, resulting in 108 "Yes."

In some instances, operation 108 may permit matches even if the integration flow lacks an endpoint indicated by the pattern as necessary. This can be useful if, for example, developers of the integration flow may have the option to add the endpoint to the flow. In some instances, developers may include a list of possible endpoints (including some which are not in the integration flow), which can be utilized for the comparisons of operation 106.

In some instances, rather than iterating through patterns to look for matches in the flow as described in method 100, systems consistent with the present disclosure may iterate through subsets of the flow to look for matches in the pattern library.

If no pattern match is found (108 "No"), method 100 further comprises determining whether the pattern library includes additional patterns to check at operation 110. If additional patterns exist (110 "Yes"), method 100 returns to operation 104, selecting another pattern from the pattern library.

If a pattern match is found (108 "Yes"), method 100 further comprises identifying an endpoint associated with the matched pattern at operation 112. The endpoint can be, for example, a third-party application included in the integration flow. The pattern library may indicate which endpoints are associated with which snippets. For example, as part of storing a pattern, the pattern library may store a snippet representing the pattern, an endpoint capable of performing the snippet, and an "artifact," discussed further below. Multiple endpoints may be capable of performing a given snippet. Thus, in some instances, operation 112 may include identifying multiple endpoints. The endpoints identified via operation 112 can be added to a list of "distribution options," updated over time as operations 104-110 are performed.

As an example, an integration flow may include a pattern having a subset of nodes "acquire destination," "acquire location," "send destination and location to navigation endpoint with instructions to plot route," "receive route," and "provide route to user." A pattern library might include a pattern with a snippet having the same nodes. The pattern might be associated with the navigation endpoint and with a messaging endpoint. In such an example, operation 112 may include identifying that the navigation endpoint is capable of performing the nodes, and also identifying that the messaging endpoint is also capable of performing the nodes.

Once an endpoint associated with the matched pattern is identified, method 100 further comprises adding an artifact for the pattern/endpoint combination to a list at operation 114. The artifact may be a predetermined set of instructions to be executed by the endpoint, resulting in performance of the nodes of the pattern. For example, a pattern library may store a "plot route" pattern, which can be associated with a navigation endpoint. The pattern library may also store an artifact (e.g., high level configuration code, a set of precompiled instructions, function calls, binary, etc.) which, when executed during operation of the navigation endpoint, results in the navigation endpoint performing the "plot route" pattern. This artifact can later be sent to the endpoint, should the user wish to do so.

The artifact can be preprogrammed by, for example, a developer of the endpoint. For example, an expert familiar with the inner workings of an endpoint application may be able to add the artifact and snippet to the pattern library (or submit it to a user, who may decide whether to add it to the library). Thus, as the pattern library is populated over time, method 100 becomes more useful at identifying opportunities for distributing nodes of the integration flow.

Once the artifact has been added to the list, method 100 proceeds to check whether the pattern library includes additional patterns to check at operation 110. Once all patterns have been checked (110 "No"), method 100 ends at 116.

In some instances, one or more redundant nodes may be omitted or replaced from the integration flow for purposes of comparison at operation 108. Redundant nodes, for purposes of this disclosure, are nodes in a subset which would not need to be performed if the subset was being performed by a particular endpoint. As an example, an integration flow may include a subset having nodes "acquire destination," "acquire location," "send destination and location to navigation endpoint with instructions to plot route," "receive route," and "provide route to user." In such an example, if the navigation endpoint is performing the subset, the navigation endpoint would not need to send the location and route to itself. Thus, a subset may include the navigation endpoint performing all of the nodes except for "send destination and location navigation endpoint with instructions to plot route." While the navigation endpoint may not perform each node, this "send" node should not disqualify the navigation endpoint from performing the overall subset. Therefore, in order to prevent erroneously disqualifying otherwise-capable endpoints, some nodes may be omitted from comparison at operation 108.

Figure 2:
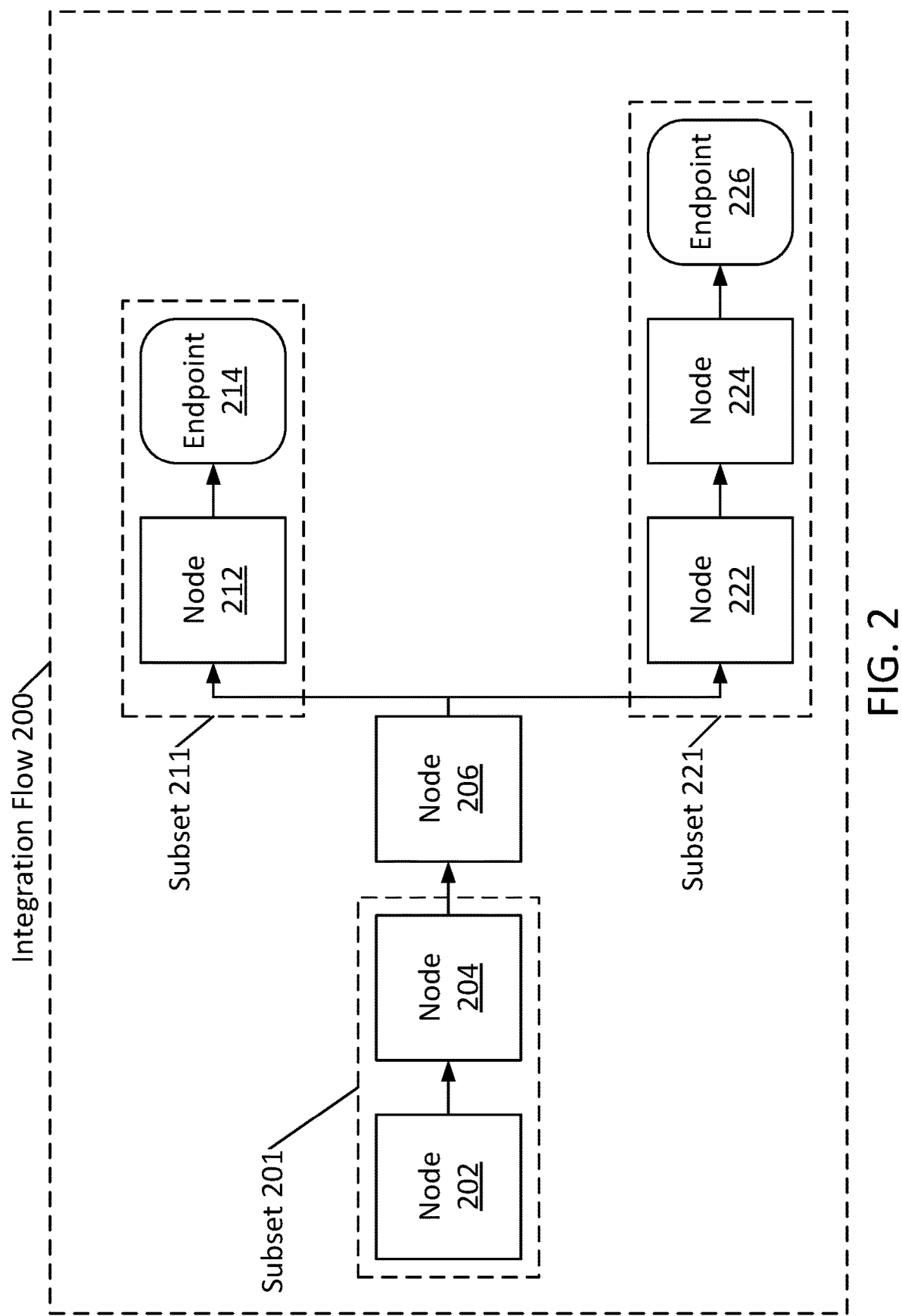
FIG. 2 is a diagram of an abstracted example integration flow, including multiple nodes and endpoints organized into different subsets, consistent with several embodiments of the present disclosure.

FIG. 2 is a diagram of a simple example integration flow 200, including multiple nodes and endpoints organized into different subsets, consistent with several embodiments of the present disclosure. Integration flow 200 is provided as a high-level template of an example integration flow. Each node in FIG. 2, all of which are depicted as squares, may represent a particular function to be performed, such as reading/processing/analyzing data, transmitting information, controlling a device, etc. In general, functions designated by nodes may be performed by a central system of flow 200, such as a server (not shown in FIG. 2). Endpoints, such as endpoint 214 and endpoint 216, represent a function to be performed by an application other than the central system, such as a third-party application. Thus, for example node 202 may perform a first function, after which node 204 may perform a second function, allowing node 206 to perform a third function, and so on. Node 206 is connected to both node 212 and node 222, which may indicate that either route is possible (or both); node 206 may include conditions describing when the flow should proceed to node 212 vs. 222. Once the function represented by node 212 is performed, endpoint 214 indicates that a third-party application should take some action. In some instances, endpoint 214's "action" can be as simple as "receiving" an output produced by node 212. Similarly, node 212 may involve transmitting instructions to endpoint 214 to perform further operations.

As shown in FIG. 2, integration flow 200 includes three designated subsets. Subset 201 includes node 202 and node 204, subset 211 includes node 212 and endpoint 214, and subset 221 includes node 222, node 224, and endpoint 226. Node 206 is not within any particular subset. In some instances, a node may be within multiple subsets, though this is not the case in the example flow 200 shown in FIG. 2. These subsets can be designated manually, such as by experts familiar with endpoints 214 and 226. For example, an expert familiar with a third-party application that is indicated by endpoint 214 may note that endpoint 214 is also capable of performing node 212. This knowledge can be stored in a "pattern" (not shown in FIG. 2), which may include a snippet functionally equivalent to subset 211, the identity of endpoint 214, and an artifact that can cause endpoint 214 to perform node 212. This pattern can be stored in a pattern library (not shown in FIG. 2). This way, when developing flow 200, a developer can perform a method (such as, for example, method 100) to search various patterns in order to determine whether any of the workload of flow 200 can be performed by endpoints rather than the central system.

Another pattern stored in a pattern library (not shown in FIG. 2) may indicate that, for example, endpoint 226 is capable of performing all of subset 221 (or a snippet functionally identical to all of subset 221). In other words, endpoint 226 may be capable of performing the functions of node 222 and node 224 (or functions of different nodes that produce the same outcome as those of node 222 and node 224).

Even if a developer of flow 200 is aware that, for example, endpoint 226 can perform the functions of nodes 222 and 224, the developer may not be familiar enough with endpoint 226 to configure the associated third-party application to perform those functions. For example, if the function represented by node 224 is "retrieve location data," the developer may be informed that the third-party app of endpoint 226 is capable of retrieving location data on its own. However, the developer may not know how to cause the third-party app to actually retrieve location data. Thus, when a pattern is created to show that a third-party application can perform an entire subset, it may also include one or more artifacts, essentially prepackaged instructions to cause the third-party app to retrieve location data.

As an illustrative example, integration flow 200 could describe a parking garage gate system. For example, node 202 may represent an operation of detecting a ticket and node 204 may represent an operation of displaying a price, both of which may be performed by a card reader. Node 206 could be processing a credit card payment, which could fork to nodes 212 and 222. Other nodes could represent sending a signal to actuate a gate to an endpoint (which could be a motor driver), compiling and printing a receipt, etc.

Figure 3:
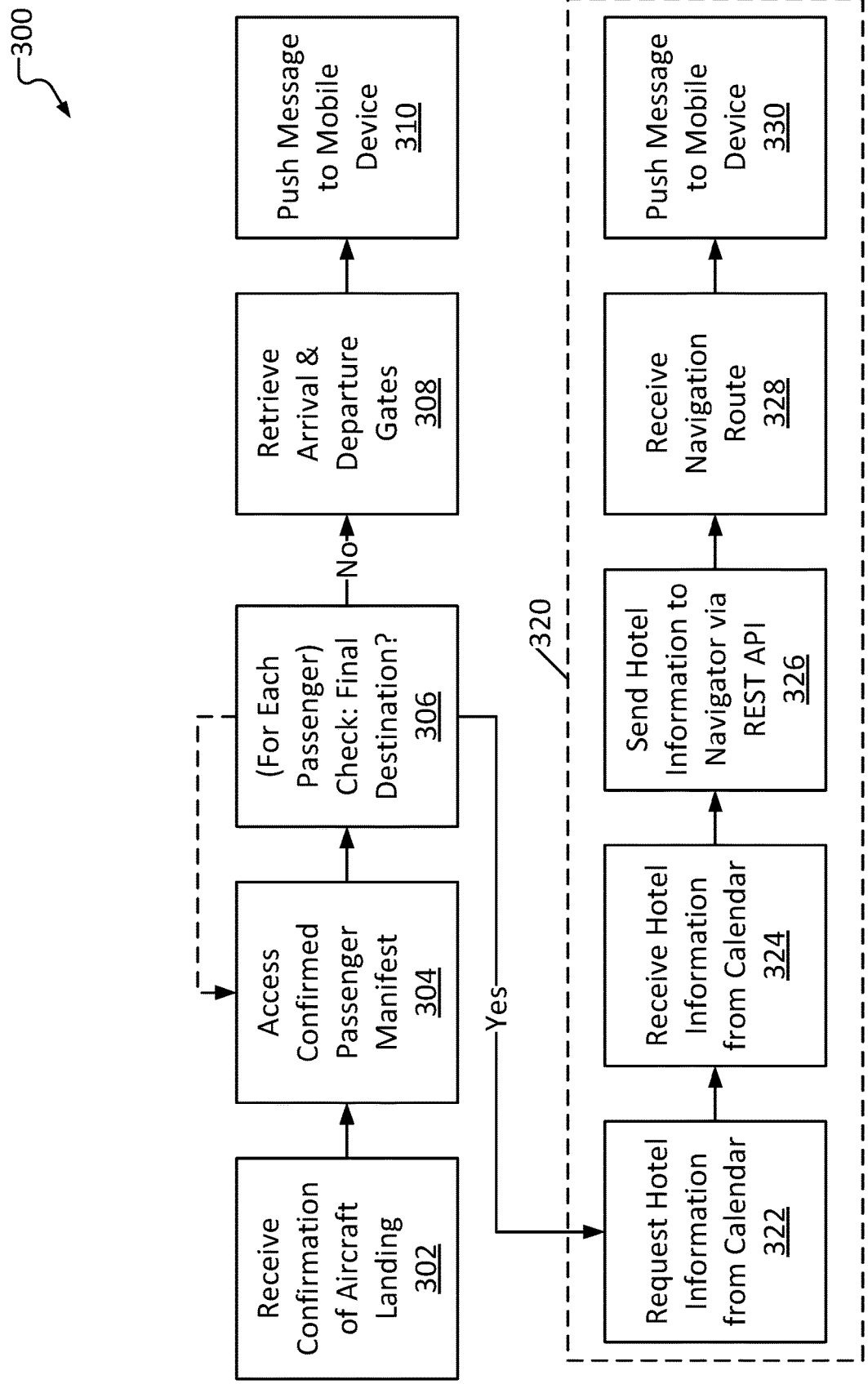
FIG. 3 is a diagram of an example integration flow, including a recognizable pattern, consistent with several embodiments of the present disclosure.

FIG. 3 is a diagram of an example integration flow 300, including a subset 320, consistent with several embodiments of the present disclosure. Integration flow 300 ("flow 300") is provided as an additional illustrative example of a possible integration flow, without limitation. Flow 300 may be a part of a larger flow performed by a commercial airline application (e.g., an "airline app") installed on a user's mobile device. In particular, the nodes of flow 300 may enable the example airline app to automatically provide a passenger with a route to the passenger's hotel (if any) upon arriving at their final destination.

Flow 300 comprises a first node 302 configured to receive confirmation of an aircraft landing. Node 302 may include additional details (not shown in FIG. 3) describing how this might be accomplished. For example, node 302 may be performed by the airline app accessing the airline's internal system. In some instances, node 302 may include transmitting a request to an air traffic control system and receiving a response.

Flow 300 further comprises a second node 304 configured to access a confirmed passenger manifest. Similar to node 302, the operations defined by node 304 may be performed by the airline app accessing the airline's internal system.

Flow 300 further comprises a third node 306 configured to determine (for each passenger) whether the aircraft has landed at the passenger's final destination. Node 306 may also be performed by the airline app accessing the airline's internal system. However, node 306 may alternatively (or additionally) be performed by accessing the passenger's calendar and/or email (e.g., searching for an itinerary).

If the aircraft has not landed at the passenger's final destination (306 "No"), flow 300 proceeds to node 308, where it retrieves the passenger's arrival and departure gates. This information may be retrieved by the airline app from storage (e.g., the airline app may have stored the gate information for the itinerary). In some instances, in performing node 308, the airline app may request gate information from the airline's system and/or an airport in case gates have changed. Once the gate information is retrieved, flow 300 proceeds to node 310, where the airline app pushes a message to the user's mobile device including this information.

If the arrival is at the passenger's final destination (306 "Yes"), flow 300 proceeds to determine a destination (such as a hotel) if possible and provide the user with a route to the destination. In the example flow 300 depicted in FIG. 3, this is depicted as nodes 322-330, identifying a hotel and its location and causing a navigation application (navigation "endpoint") to return a planned route to the hotel. Specifically, flow 300 proceeds from 306 "Yes" to node 322, where the airline app requests hotel information. For example, the airline app might request an identity of a hotel the passenger is booked to stay at from the passenger's digital calendar (a "calendar endpoint," which may be stored locally on the user's mobile device, or may be stored online). The app may also request the hotel's location. Node 322 could also be performed as multiple steps, such as requesting a hotel name from a calendar endpoint, receiving the hotel name, and requesting a location from a map endpoint using the received hotel name.

Flow 300 then proceeds to node 324, where the airline app receives the hotel information (in response to the request(s) sent via node 322). For example, the airline app might receive an address and name of a hotel the user is scheduled to stay at. At node 326, the airline app sends this hotel information to a navigation endpoint, along with instructions to plot a route from the mobile device's current location to the hotel's location. Node 326 may specify that this information is to be sent via a Representational State Transfer (REST) Application Programming Interface (API). This level of specificity may aid systems and methods consistent with the present disclosure in identifying matching snippets.

At node 328, the airline app receives a route from the navigation endpoint in response to the request sent via node 326. At node 330, the airline app pushes a message to the user's mobile device indicating that a route to the user's hotel is already prepared.

Notably, several of nodes 322-330 (collectively, "subset 320") require the airline app to send requests to a third party application ("endpoint"), receive information from the endpoint, send further information to another endpoint, and so on. In essence, the airline app serves as a middleman between multiple endpoints. While this may function adequately for the user's purposes, it may result in inefficient usage of computing resources. This is because one or more of the endpoints may already be capable of performing some or all of these functions themselves. For example, the navigation endpoint may already be capable of retrieving the hotel information from the calendar endpoint. If flow 200 were adjusted to have the navigation endpoint retrieve the hotel information instead of, for example, the airline app, this could reduce the workload required by the airline app. Further, the navigation endpoint may be more effective or efficient at retrieving the hotel information; thus, the reorganized flow 200 may also result in improved performance overall. As another example, the calendar endpoint may already be capable of retrieving a route from the navigation endpoint. These examples could provide opportunities to streamline the process, resulting in improved efficiency and saving computing resources.

In other examples, an overall number of operations can be reduced. As an example, some unoptimized integration flows may require multiple different applications to communicate back and forth with one another to gather various data when, in reality, one of the applications is fully capable of gathering all of the data by itself. As another example, an application specialized in performing a given task may perform that task more effectively and/or efficiently than a different, more generalized application. Thus, rather than develop its own capabilities, it may be prudent to have the specialized application perform the task, particularly if the specialized application is already being utilized for some other purpose. Systems and methods consistent with the present disclosure enable detecting opportunities such as these, as well as informing an integration flow developer that such opportunities exist.

As an example, rather than requesting a route from a navigation endpoint, receiving the route from the navigation endpoint, and pushing a message to notify a user about the route, the airline app could instead instruct the navigation endpoint to generate a route and further instruct the navigation endpoint to push a message notifying the user about the route once the route has been generated. This way, the airline app no longer needs to wait for a response from the navigation endpoint before the message can be pushed to the mobile device; in terms of flow 300, node 328 may be made redundant and removed from the flow. In addition, this can avoid cross-compatibility concerns; the navigation endpoint no longer needs to be capable of formatting the route in a way that the airline app can recognize. Similarly, the airline app no longer needs to be capable of recognizing a route generated by the navigation endpoint. As the two applications may be developed by completely different parties (possibly even using different programming languages), reducing instances which require the two applications to communicate with one another can significantly improve development as well as performance.

Figure 4:
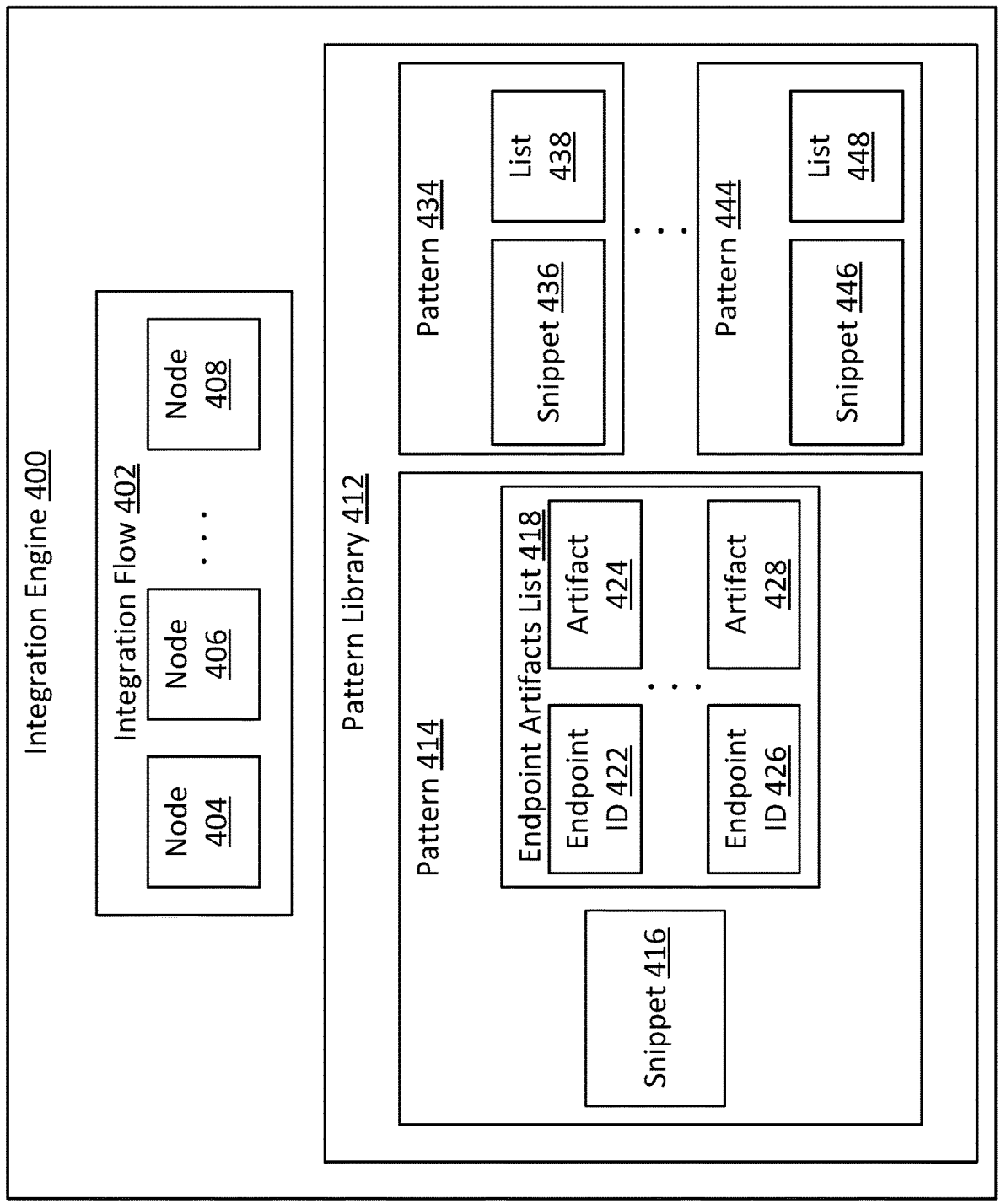
FIG. 4 is a diagram of an example integration engine, consistent with several embodiments of the present disclosure.

FIG. 4 is a diagram of an example integration engine 400, consistent with several embodiments of the present disclosure. Integration engine 400 includes an integration flow 402 as well as a pattern library 412. Integration flow 402 may include a plurality of interconnected nodes 404, 406, 408. In some instances, integration flow 402 may be substantially similar to integration flows 200 and/or 300, described above with reference to FIG. 2 and FIG. 3, respectively.

In some instances, integration flow 402 may be a work-in-progress integration flow. For example, a developer of integration flow 402 or an application configured to perform flow 402 may submit integration flow 402 to integration engine 400 to identify patterns that can be performed by endpoints.

Pattern library 412 stores a plurality of patterns such as pattern 414, pattern 434, and pattern 444. Each pattern stored in pattern library 412 can include details such as a snippet of nodes and a list of endpoints capable of executing the snippet, along with endpoint artifacts enabling the endpoints to execute the snippet. For example, pattern 414 includes snippet 416 and endpoint artifacts list 418. Snippet 416 may include a group of nodes, while each endpoint identified in list 418 may be capable of executing the group of nodes represented by snippet 416.

As an example, snippet 416 may consist of node 404 and node 406. Node 404 may dictate operations such as "retrieve destination name from calendar endpoint" and node 406 may dictate operations such as "retrieve destination address from map endpoint." Endpoint ID 422 may correspond to a navigation endpoint, while endpoint ID 426 may correspond to a shopping endpoint. Artifact 424 may be a script or function that, when called or executed by the navigation endpoint, results in the navigation endpoint retrieving a destination name from a calendar endpoint and retrieving a destination address from a map endpoint. Similarly, artifact 428 may be a script or function that, when called or executed by the shopping endpoint, results in the shopping endpoint retrieving a destination name from a calendar endpoint and retrieving a destination address from a map endpoint.

Thus, a developer of integration flow 402 may submit flow 402 to integration engine 400, which may in turn analyze flow 402 in view of pattern library 412. Integration engine 400 may then determine, by comparing snippet 416 to subsets of nodes in flow 402, that flow 402 matches pattern 414 (due to snippet 416 matching nodes 404 and 406). Further, integration engine 400 may determine that endpoints 422 and 426 are capable of performing nodes 404 and 406. Should the developer wish to modify flow 402 to have endpoint 422 perform nodes 404 and 406, integration engine 400 can return artifact 424, which the developer can send to the endpoint to accelerate/aid in implementation.

Integration engine 400 can also check for additional patterns (e.g., pattern 434 and pattern 444). For example, snippet 436, executable by endpoints via artifacts listed in list 438, may also be present within integration flow 402. In contrast, snippet 446 may not be present in flow 402, and thus list 448 may not be utilized for flow 402.

Figure 5:
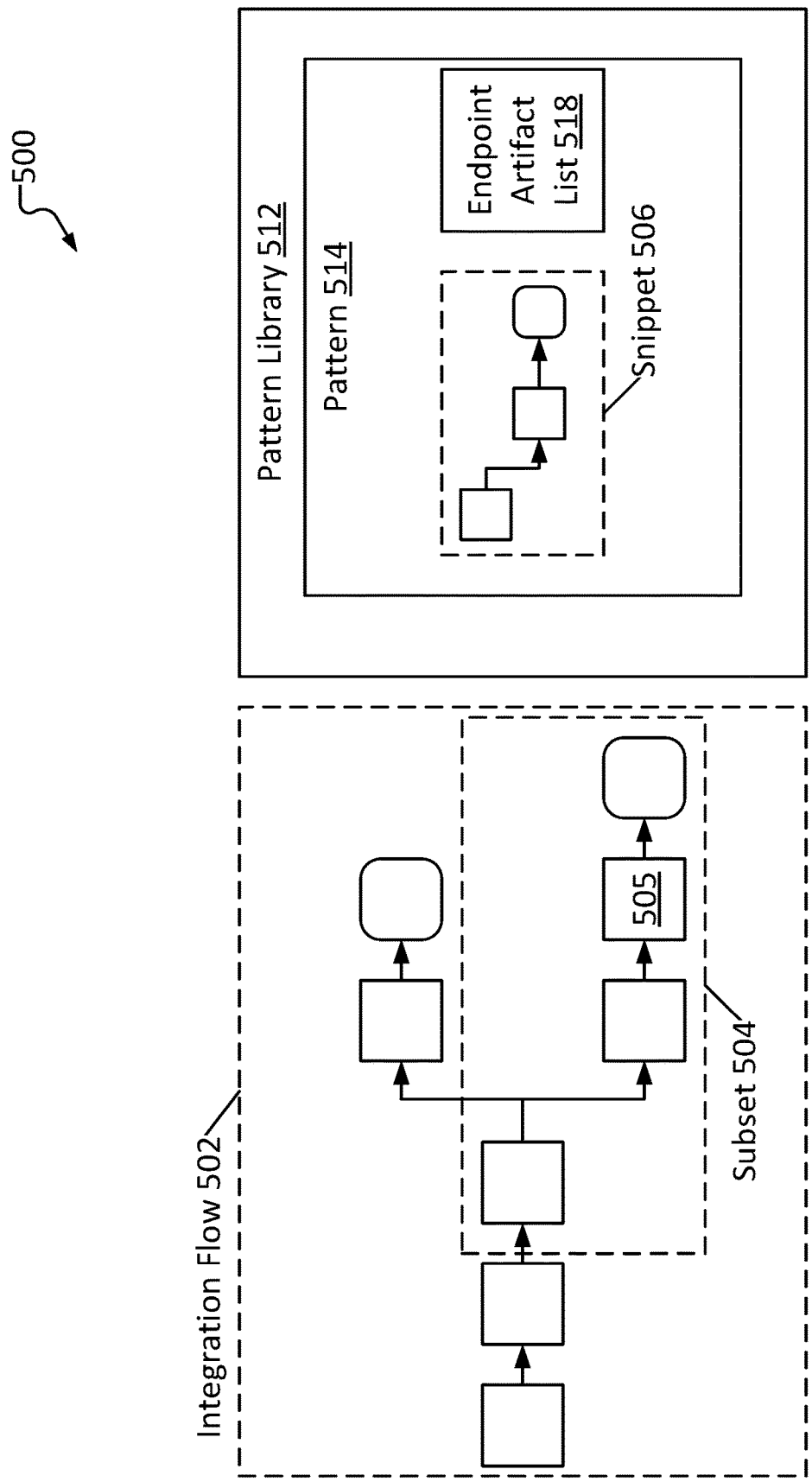
FIG. 5 is an illustrative example diagram showing an integration flow subset in comparison with a snippet, consistent with several embodiments of the present disclosure.

FIG. 5 is an illustrative example diagram 500 showing an integration flow subset 504 in comparison with a snippet 506, consistent with several embodiments of the present disclosure. As shown in diagram 500, integration flow 502 includes a flow subset 504 of nodes, while pattern library 512 includes a pattern 514 with a snippet 506. Snippet 506 may be functionally equivalent to flow subset 504. Notably, snippet 506 may not necessarily be identical to flow subset 504; flow subset 504 includes node 505, which is absent from snippet 506. However, snippet 506 may be identified to have substantially identical functionality as flow subset 504. Pattern 514 may also include endpoint artifact list 518, which in turn may include a list of endpoints capable of performing snippet 506, as well as artifacts to cause those endpoints to perform snippet 506. Of course, pattern library 512 may include multiple other patterns (not shown in FIG. 5) having their own snippets, some of which may also match flow subset 504 (or other subsets not labeled in FIG. 5).

Figure 6:
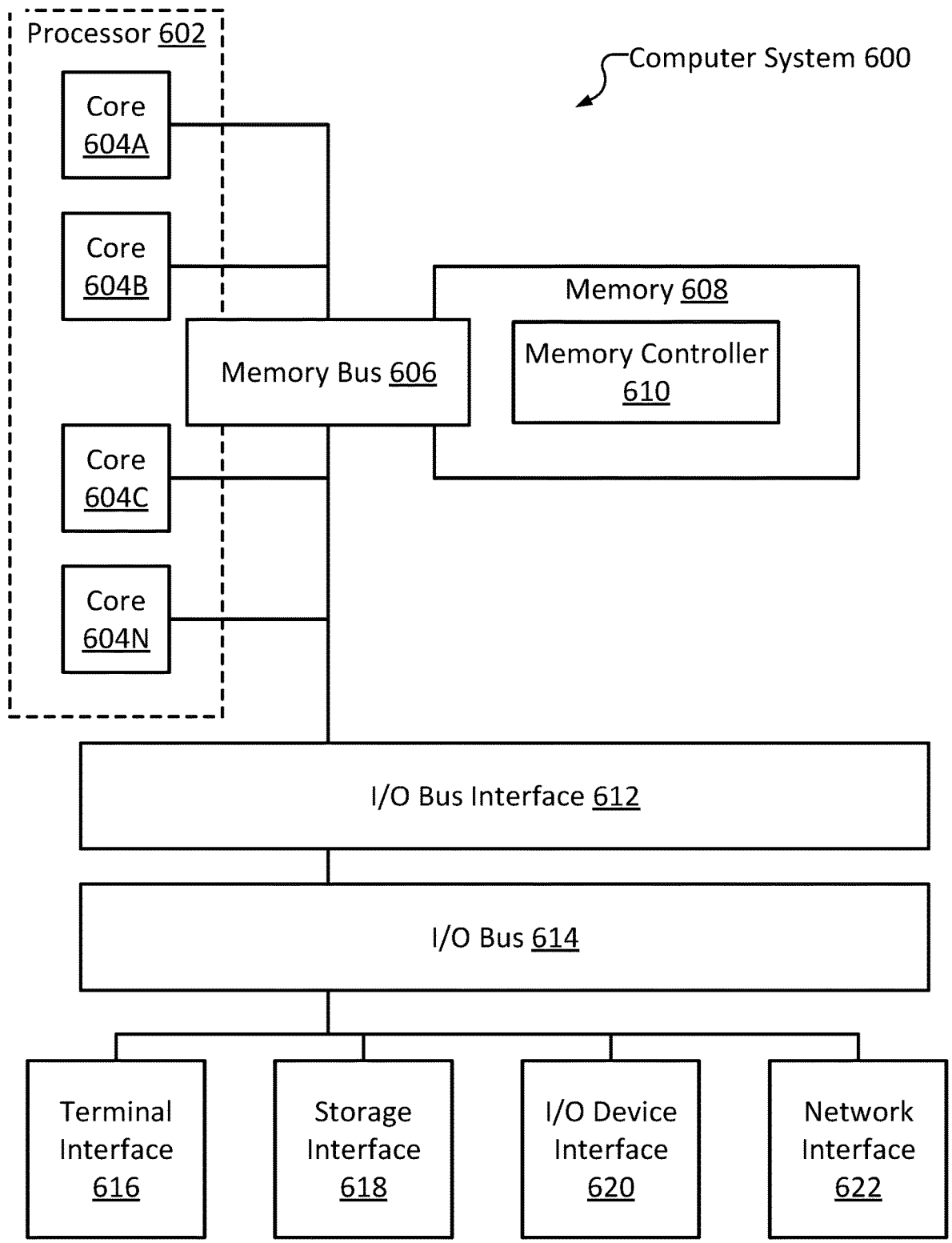
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, method 100. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

What is claimed is:

1. A method, comprising:
   receiving an integration flow including a subset of nodes;
   identifying a pattern, including a snippet of nodes, that matches a functionality of the subset of nodes, wherein the pattern is associated with a first endpoint indicating that the snippet can be performed by the first endpoint; and
   in response to identifying the pattern, updating the integration flow to cause the first endpoint to perform the snippet of nodes.

2. The method of claim 1, further comprising, in response to identifying the pattern, providing an artifact configured to cause the first endpoint to perform the snippet when the artifact is sent to the first endpoint.

3. The method of claim 1, wherein the updating includes replacing the subset of nodes in the integration flow with the snippet.

4. The method of claim 1, further comprising:
   presenting the pattern as a distribution option; and
   receiving a user input, wherein the updating is in response to the user input.

5. The method of claim 1, wherein:
   the integration flow does not, prior to the updating, include an endpoint to perform the subset of nodes; and
   the updating includes assigning the first endpoint to perform the snippet of nodes.

6. The method of claim 1, wherein:
   a second endpoint is, prior to the updating, configured to perform the subset of nodes; and
   the updating includes assigning the first endpoint to perform the snippet of nodes instead of the second endpoint.

7. The method of claim 1, wherein the updating includes creating a candidate integration flow.

8. A system, comprising:
   a memory; and
   one or more central processing units (CPUs) coupled to the memory, the one or more CPUs configured to:
      receive an integration flow including a subset of nodes;
      identify a pattern, including a snippet of nodes, that matches a functionality of the subset of nodes, wherein the pattern is associated with a first endpoint indicating that the snippet can be performed by the first endpoint; and
      in response to identifying the pattern, update the integration flow to cause the first endpoint to perform the snippet of nodes.

9. The system of claim 8, wherein the one or more CPUs are further configured to, in response to identifying the pattern, provide an artifact configured to cause the first endpoint to perform the snippet when the artifact is sent to the first endpoint.

10. The system of claim 8, wherein the updating includes replacing the subset of nodes in the integration flow with the snippet.

11. The system of claim 8, wherein the one or more CPUs are further configured to:
    present the pattern as a distribution option; and
    receive a user input, wherein the updating is in response to the user input.

12. The system of claim 8, wherein:
    the integration flow does not, prior to the updating, include an endpoint to perform the subset of nodes; and
    the updating includes assigning the first endpoint to perform the snippet of nodes.

13. The system of claim 8, wherein:
    a second endpoint is, prior to the updating, configured to perform the subset of nodes; and
    the updating includes assigning the first endpoint to perform the snippet of nodes instead of the second endpoint.

14. The system of claim 8, wherein the updating includes creating a candidate integration flow.

15. A computer program product, the computer program product comprising a computer readable storage medium having program instructions embodied therewith, the program instructions executable by a computer to cause the computer to:
    receive an integration flow including a subset of nodes;
    identify a pattern including a snippet of nodes, that matches a functionality of the subset of nodes, wherein the pattern is associated with a first endpoint indicating that the snippet can be performed by the first endpoint; and
    in response to identifying the pattern, update the integration flow to cause the first endpoint to perform the snippet of nodes.

16. The computer program product of claim 15, wherein the instructions further cause the computer to, in response to identifying the pattern, provide an artifact configured to cause the first endpoint to perform the snippet when the artifact is sent to the first endpoint.

17. The computer program product of claim 15, wherein the updating includes replacing the subset of nodes in the integration flow with the snippet.

18. The computer program product of claim 15, wherein the instructions further cause the computer to:
   present the pattern as a distribution option; and
   receive a user input, wherein the updating is in response to the user input.

19. The computer program product of claim 15, wherein:
   the integration flow does not, prior to the updating, include an endpoint to perform the subset of nodes; and
   the updating includes assigning the first endpoint to perform the snippet of nodes.

20. The computer program product of claim 15, wherein:
   a second endpoint is, prior to the updating, configured to perform the subset of nodes; and
   the updating includes assigning the first endpoint to perform the snippet of nodes instead of the second endpoint.

\* \* \* \* \*